(No Model.)

F. HALBEHANN.
BUTTON HOLE CUTTER.

No. 414,528. Patented Nov. 5, 1889.

Witnesses:

Inventor.
Franz Halbehann

UNITED STATES PATENT OFFICE.

FRANZ HALBEHANN, OF SOLINGEN, PRUSSIA, GERMANY, ASSIGNOR TO GEORG HEBERLEIN, OF SAME PLACE.

BUTTON-HOLE CUTTER.

SPECIFICATION forming part of Letters Patent No. 414,528, dated November 5, 1889.

Application filed May 28, 1889. Serial No. 312,366. (No model.) Patented in Germany October 24, 1888, No. 47,615.

*To all whom it may concern:*

Be it known that I, FRANZ HALBEHANN, a subject of the King of Prussia, German Emperor, and a resident of Solingen, in the Kingdom of Prussia, German Empire, have invented a certain new and useful Improvement in Scissors for Cutting Button-Holes, (for which I have applied for Letters Patent in Germany, dated 24th of October, 1888, and numbered 47,615,) of which the following is an exact description.

My improvement consists in constructing the scissors in such a manner that it is possible with one and the same pair of scissors, by regulating the same, to cut any number of button-holes of any desired certain length.

In order to make my description more clear, I refer to the accompanying drawings, in which similar letters denote similar parts throughout the several views.

Figure 1:
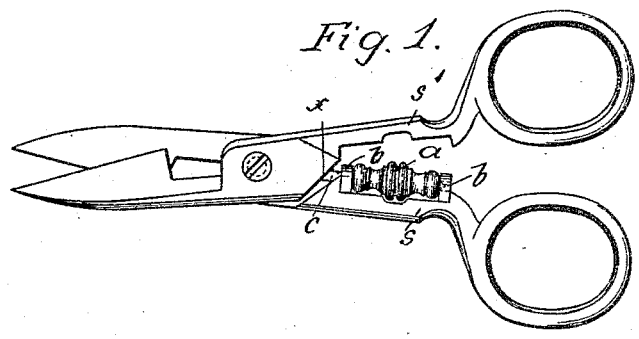
Figure 2:
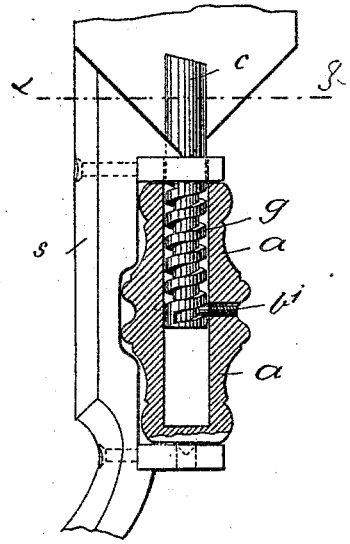
Figure 3:
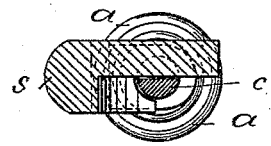

Figure 1 is a view of the scissors. Fig. 2 shows a view of the regulating apparatus, drawn to a larger scale. Fig. 3 is a section on A B in Fig. 2.

Between the handles $s\ s'$ of the scissors and fixed to one of the handles $s$ are the bearings $b\ b$ of the piece $a$. This piece $a$ may be turned round by means of the corded rim on the same. Working up and down in the piece $a$ is a rod $c$, which has a screw-thread $g$ on its one end, and the part of the rod $c$ which has no thread is made half-round. This rod $c$ projects through the end of the piece $a$ and is guided by the blade on the scissor-handle $s$—that is to say, the flat side of the rod $c$ lies against the flat side of the blade of the handle $s$, so that when the piece $a$ is turned round the rod, not being able to turn, will be worked in and out of the piece $a$ by means of the thread $g$ and pin $b'$. When, now, the piece $a$ is turned round until the rod $c$ is quite down inside the same, the handles of the scissors are able to be shut close together in cutting, and in consequence a button-hole will be cut as long as the whole length of the scissor-blades. When, however, the rod $c$ is screwed out, so that it comes to lie on the inside part of the blade of handle $s$, as shown in Fig. 1, the scissors cannot be shut together, because the edge $x$ of the blade of the handle $s'$ comes against the end of the rod $c$, in consequence of which the blades do not come together along their whole length, and the length of the button-hole will correspond to the length of the parts of the blades which close over each other. By this most simple arrangement the scissors may be regulated to cut button-holes of any desired length.

I am aware that button-hole scissors with a regulating-nut have been constructed previous to my application; but in these constructions a hole has been made through the opposite shank to that on which the nut is fixed, which weakens the said shank considerably, or, in the case of its being made stronger at the point where the hole is bored, gives it a clumsy appearance.

What I claim, and desire to secure by Letters Patent of the United States, is—

In button-hole scissors, the combination of the nut $a$, fixed in and between its two bearings on the shank $s$ of the scissors and having a pin $b'$, which works in the thread $g$ on the spindle $c$, causing the same to move in and out of the nut, the spindle $c$ being prevented from turning round by its flat side coming against the flat side of the shank $s$, the slanting end of the spindle $c$ coming against the slanting side $x$ of the shank $s'$ of the scissors; and thus regulating the size of the button-holes to be cut, in the manner substantially as described.

In witness whereof I have hereunto set my my hand in presence of two witnesses.

FRANZ HALBEHANN.

Witnesses:
OTTO WUPPER,
RICHARD KÖNIG.